US012655825B2

(12) United States Patent
    Pol et al.

(10) Patent No.: US 12,655,825 B2
(45) Date of Patent: Jun. 16, 2026

(54) METHODS AND SYSTEMS FOR THRUST-BASED TURBINE WAKE CONTROL

(71) Applicant: Texas Tech University System, Lubbock, TX (US)

(72) Inventors: Suhas Pol, Lubbock, TX (US); Ricardo Castillo, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 0 days.

(21) Appl. No.: 18/681,421

(22) PCT Filed: Aug. 5, 2022

(86) PCT No.: PCT/US2022/039596
    § 371 (c)(1),
    (2) Date: Feb. 5, 2024

(87) PCT Pub. No.: WO2023/014984
    PCT Pub. Date: Feb. 9, 2023

(65) Prior Publication Data
    US 2024/0328388 A1      Oct. 3, 2024

Related U.S. Application Data

(60) Provisional application No. 63/230,683, filed on Aug. 6, 2021.

(51) Int. Cl.
    *F03D 7/04*        (2006.01)
    *F03D 7/02*        (2006.01)

(52) U.S. Cl.
    CPC ............. *F03D 7/049* (2023.08); *F03D 7/022* (2013.01); *F05B 2270/327* (2013.01)

(58) Field of Classification Search
    CPC ..... F03D 7/022; F03D 7/049; F05B 2270/327
    See application file for complete search history.

(56) References Cited

U.S. PATENT DOCUMENTS 9,372,263 B2 *   6/2016   Oswald ................... G01S 7/414
9,519,056 B2 *  12/2016   Schroeder ............... G01P 5/001
                (Continued)

FOREIGN PATENT DOCUMENTS

WO      WO-2021096363 A1 *   5/2021   ........... F03D 7/0204

OTHER PUBLICATIONS

PCT/US2022/039596. International Search Report (Nov. 1, 2022).

*Primary Examiner* — Tulsidas C Patel
*Assistant Examiner* — Thomas K Quigley
(74) *Attorney, Agent, or Firm* — LOZA & LOZA, LLP; Kevin L. Soules

(57) ABSTRACT

A method, system, and apparatus for improving wind harvest efficiency comprises: a wind turbine, a processor, and a computer-usable medium embodying computer code, said computer-usable medium being coupled to said processor, said computer code comprising non-transitory instruction media executable by said processor configured for: setting a desired location range of a wind wake with a controller, determining an error signal indicative of a difference between a currently measured cross-stream thrust component of wind and an optimal cross-stream thrust component of wind, adjusting a speed of a rotor associated with the wind turbine according to the error signal, and confining a real-time position of the wind wake to the desired location range of the wind wake.

17 Claims, 13 Drawing Sheets

(56)  References Cited

U.S. PATENT DOCUMENTS

| | | | |
|---|---|---|---|
| 9,575,177 B2 * | 2/2017 | Schroeder | G01P 5/001 |
| 10,047,722 B2 * | 8/2018 | Vaddi | G05B 15/02 |
| 10,585,171 B2 * | 3/2020 | Oswald | G01S 13/87 |
| 12,037,985 B2 * | 7/2024 | Gebraad | F03D 7/0284 |
| 2006/0131889 A1 * | 6/2006 | Corten | F03D 13/20 |
| | | | 290/43 |
| 2006/0232073 A1 * | 10/2006 | Corten | F03D 7/048 |
| | | | 290/44 |
| 2013/0300115 A1 * | 11/2013 | Seem | F03D 7/048 |
| | | | 290/44 |
| 2014/0028495 A1 * | 1/2014 | Schroeder | G01S 13/589 |
| | | | 342/26 R |
| 2014/0028496 A1 * | 1/2014 | Schroeder | G01P 5/001 |
| | | | 342/26 R |
| 2014/0167419 A1 * | 6/2014 | Quek | F03D 80/00 |
| | | | 290/55 |
| 2014/0234103 A1 | 8/2014 | Obrecht | |
| 2014/0348630 A1 * | 11/2014 | Baltas | F02K 3/06 |
| | | | 415/208.1 |
| 2015/0308416 A1 | 10/2015 | Ambekar et al. | |
| 2016/0146190 A1 | 5/2016 | Ravindra et al. | |
| 2018/0030955 A1 * | 2/2018 | Vaddi | F03D 7/028 |
| 2021/0231103 A1 | 7/2021 | Gebraad | |
| 2021/0241751 A1 * | 8/2021 | Cukurel | G10K 15/04 |
| 2022/0282706 A1 * | 9/2022 | Esbensen | F03D 13/25 |

* cited by examiner

705 — Start

710 — Generate lookup table

715 — Calibrate controller

720 — Set desired location range for wind wake

725 — Determine an error signal

730 — Adjust rotor speed according to the error signal

735 — Rotor speed confines real-time position of wind wake to the desired location range 740 — Readjust rotor speed, blade pitch, and/or yaw 745 — End

700

1000

| RPM | 1P | 2P | 3P |
|------|------|--------|--------|
| 3000 | 50 Hz | 100 Hz | 150 Hz |

$$\text{Vorticity: } \nabla \times \boldsymbol{u} = \frac{\partial V}{\partial x} - \frac{\partial U}{\partial y}$$

———— LIDAR beam

● LIDAR focus point

━━━━ Desired wake envelope trajectory

METHODS AND SYSTEMS FOR THRUST-BASED TURBINE WAKE CONTROL

CROSS REFERENCE TO RELATED PATENT APPLICATIONS

This application claims the priority and benefit under 35 U.S.C. § 119(e) of U.S. Provisional Patent Application Ser. No. 63/230,683 filed Aug. 6, 2021, entitled "METHODS AND SYSTEMS FOR THRUST-BASED TURBINE WAKE CONTROL." U.S. Provisional Patent Application Ser. No. 63/230,683 is herein incorporated by reference in its entirety.

TECHNICAL FIELD

Embodiments are generally related to the field of turbines. Embodiments are also related to wind turbines. Embodiments are further related to methods and systems used to control the wake created by turbines. Embodiments are further related to methods and systems for increasing efficiency of windfarms by controlling turbine wakes Embodiments are further related to methods and systems for reducing adverse loads on wind turbines.

BACKGROUND

As energy development increasingly relies on wind power, efforts to improve efficiency for wind energy development have also increased. As fluid propels the blades of a turbine, the fluid exiting creates a wake. For a single turbine this wake is of little consequence. However, consistently windy places where wind turbines are naturally more efficient, are limited. As such, it is a fairly common practice to place numerous individual turbines in proximity to one another in an arrangement known as a wind farm.

Wind farms are advantageous because they can be located where consistent wind is common and offer economies of scale, not possible for single turbines disposed in disparate locations. However, the wake generated by an upstream turbine can have a deleterious effect on downstream turbines in the wind farm. Individual wind turbine wake is a fundamental building block of the complex flow structure in a wind farm. It has been observed that an upwind turbine wake reduces downwind turbine power generation by 10-20%.

Wake steering has been pursued as a means of wake avoidance for downstream turbines to improve power output in a wind farm. One approach is known as yaw-based steering control. This method involves adjusting the yaw of the turbine depending on the direction of the oncoming wind. While this is a good first step in improving energy generation, it is only marginally effective because it is very difficult, or impossible, to adjust yaw attitude at the same rate as wind direction changes. By the time the yaw of the rotor has been changed the incident wind direction has changed also so the realigned yaw does not maximize efficiency.

As such, there is a need in the art for methods and systems configured to improve turbine efficiency, as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide turbines. It is another aspect of the disclosed embodiments to provide wind turbines.

It is another aspect of the disclosed embodiments to provide wind farms comprising multiple wind turbines.

It is another aspect of the disclosed embodiments to provide methods and systems for thrust-based wind turbine wake control and load control.

It will be appreciated that the methods and systems can be achieved according to the embodiments disclosed herein. For example, in certain embodiments, systems and methods for wind turbine optimization can comprise a wind turbine, a processor and a computer-usable medium embodying computer code, said computer-usable medium being coupled to said processor, said computer code comprising non-transitory instruction media executable by said processor configured for: setting a desired location range of a wind wake with a controller, determining an error signal, adjusting a speed of a rotor associated with the wind turbine according to the error signal, and confining a real-time position of the wind wake to the desired location range of the wind wake. In certain embodiments, the methods and systems include a look up table of a yaw misalignment angle and rotor speed. In certain embodiments, the systems and methods include calibrating the controller with the look up table.

The error signal can comprise a difference between a currently measured cross-stream thrust component of wind and an optimal cross-stream thrust component of wind.

In certain embodiments, the system and methods further comprise prescribing controller variables such as pitch, yaw, and speed in response to changes in cross-stream thrust using-machine learning techniques such as, but not limited to, supervised, or unsupervised learning approaches using neural networks.

In certain embodiments, the system and methods further comprise readjusting at least one of, the rotor speed, blade pitch, or yaw to minimize the difference between the currently measured cross-stream thrust component of wind and the optimal cross-stream thrust component of wind.

In certain embodiments, the system and methods further comprise setting the desired location range of a wind wake with a controller further comprising selecting the desired location range to maximize efficiency of a wind farm comprising a plurality of wind turbines.

In certain embodiments, the system and methods further comprise calibrating the controller with the data obtained from analytically derived relationships, numerical simulations, experiments on models in wind tunnels, or scaled or full-scale models installed in field conditions using regression methods ranging from linear models to supervised machine, or unsupervised learning techniques.

In certain embodiments, the system and methods further comprise mitigation of wake meander from a trajectory that is set using, yaw or other such parameters, due to instantaneous changes in inflow wind conditions including, but not limited to, wind direction, speed, or atmospheric stratification. In certain embodiments, the system and methods further comprise mitigation of adverse loads on the wind turbine due to instantaneous yaw misalignments caused to due to instantaneous changes in inflow wind conditions such as (but not limited to) wind direction, speed, or atmospheric stratification.

In certain embodiments, the system and methods further comprise permitting the use of a downstream turbine under low wind speed conditions by more effectively diverting and holding an upstream turbine wake trajectory under instantaneous, changing wind flow conditions such that it does not impact the downstream turbine that will otherwise reduce the inflow to the downstream turbine below cutting wind speeds.

In certain embodiments, the system and methods further comprise mitigating adverse, fluctuating loads on a downstream turbine by more effectively diverting and holding an upstream turbine wake trajectory under instantaneous, changing wind flow conditions such that it does not impact the downstream turbine that will otherwise be within a wake region of an upstream turbine.

In certain embodiments, the system and methods further comprise constructing a labeled dataset of wake trajectory and loads in response to changes of control variables, such as pitch, yaw, and speed, in a timely manner using controlled experiments of a scaled-model tested in a wind tunnel.

In certain embodiments, the system and methods further comprise constructing a labeled dataset, of wake trajectory and loads in response to changes of control variables, such as pitch, yaw, and speed, in a timely manner using controlled experiments of a model tested using numerical tools, such as, but not limited to, computational fluid dynamics.

In certain embodiments, the system and methods further comprise constructing a labeled dataset of wake trajectory and loads in response to changes of control variables, such as pitch, yaw, and speed, in a timely manner using controlled or uncontrolled experiments of a full-scale model tested in field settings.

In certain embodiments, the system and methods further comprise designing turbine blades such that the turbine rotor has high thrust response to changes in pitch, yaw, or speed to increase the effectiveness of the method. A high thrust response for a rotor is achieved by, but not limited to, designing the turbine blades such that the rotor has peak coefficient of thrust occurring at a tip speed ratio that is higher than operating tip speed ratio. A high thrust response for a rotor is also achieved by designing the turbine blades such that the rotor solidity is higher than that of the optimal design.

In certain embodiments, the system and methods further comprise a calibrating procedure performed by directly measuring the wake trajectory deviations by measuring velocity time-series signal spectral energy amplitude changes at periods equivalent to, but not limited to, complete 1 rotation (1P) or integral multiples (2p, 3p, and so on) measured using, but not limited to, Lidars.

In certain embodiments, the system and methods further comprise calibrating procedure performed by directly measuring the wake trajectory deviations by measuring frequency changes of velocity time-series signal spectral energy peak occurrences measured using, but not limited to, Lidars.

In certain embodiments, the system and methods further comprise calibrating procedures performed by estimating wake trajectory on a full-scale model using wind tunnel-scale models tested in wind tunnel or with simulation tools.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

4

Figure 1:
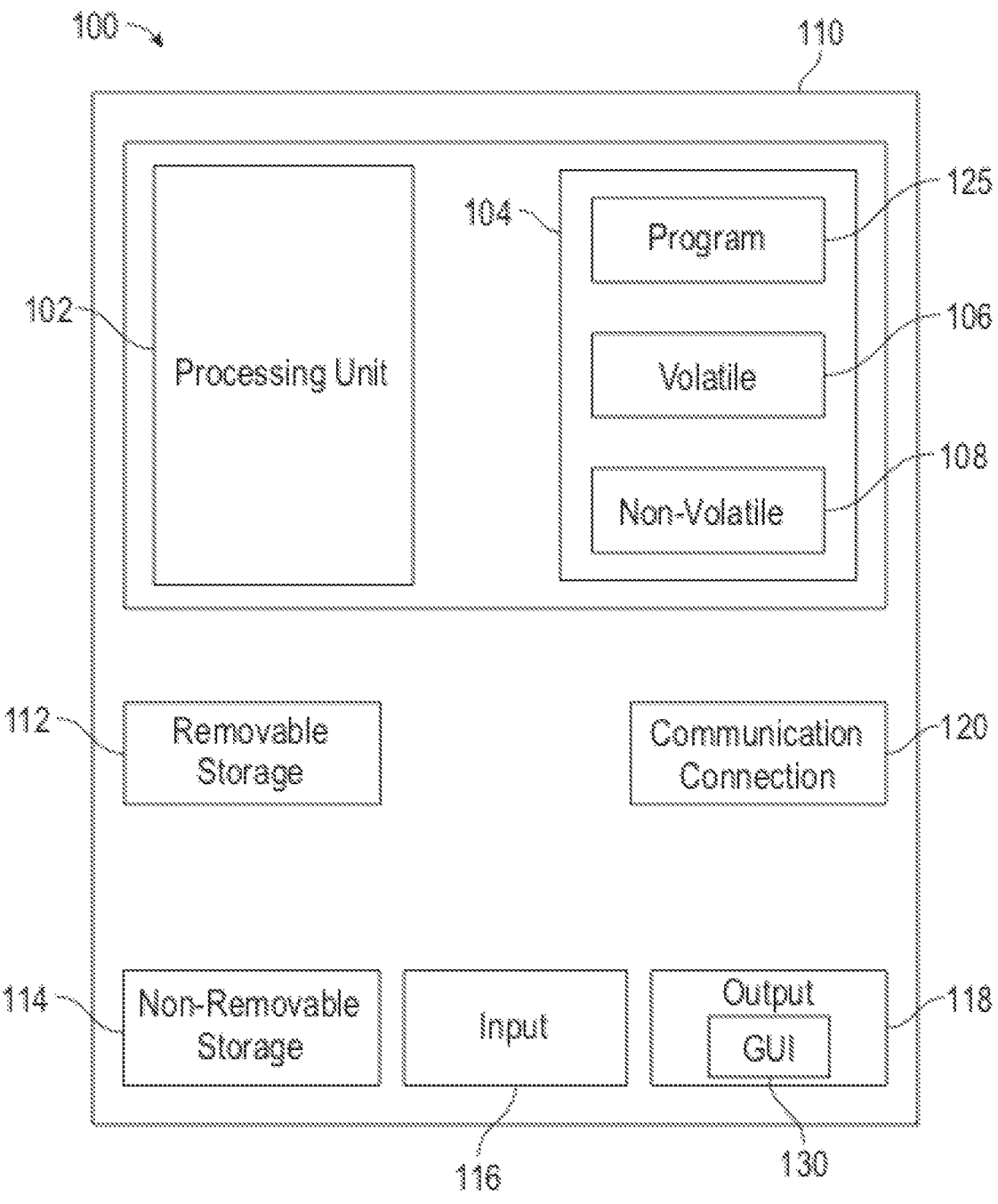
Figure 2:
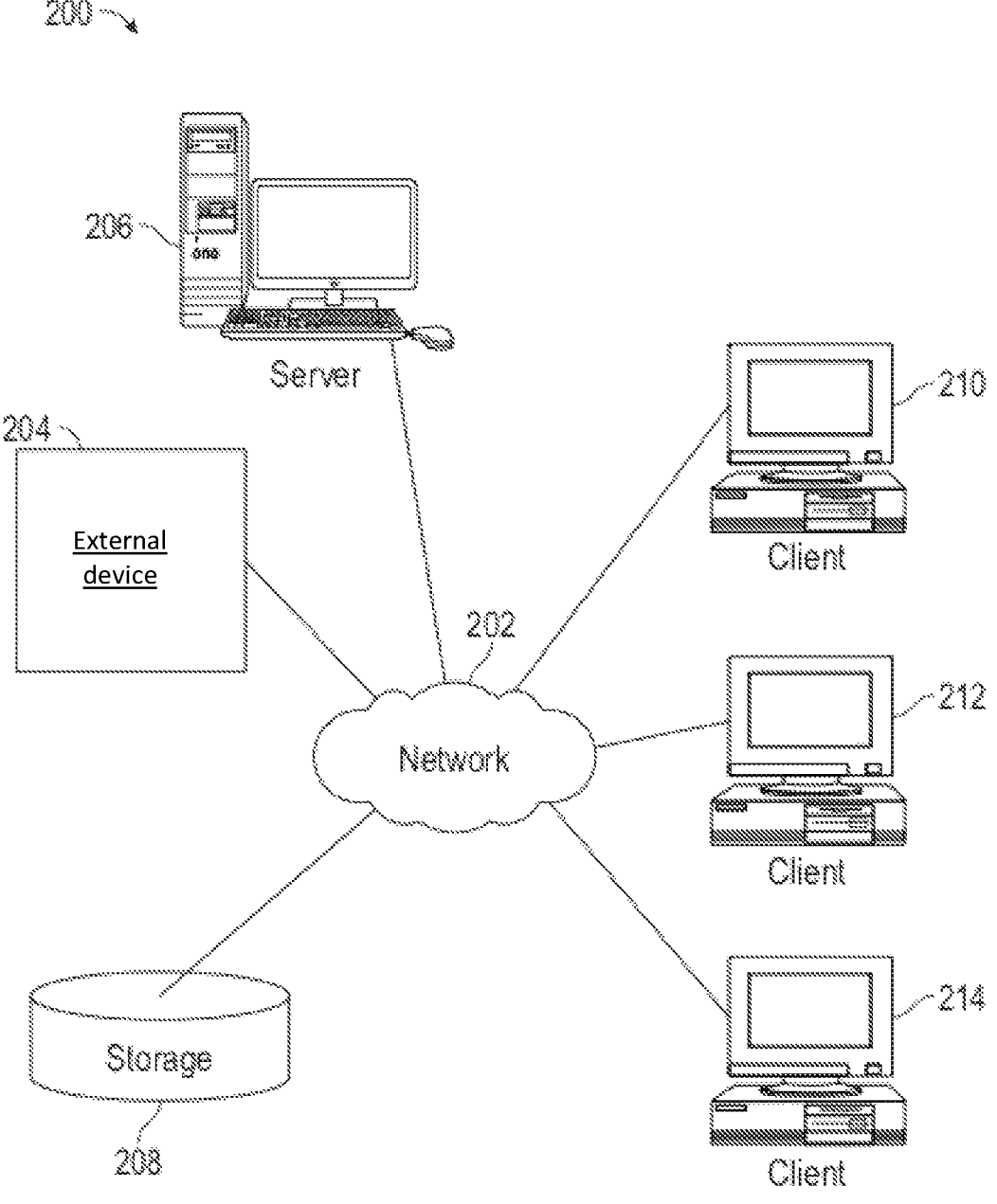
Figure 3:
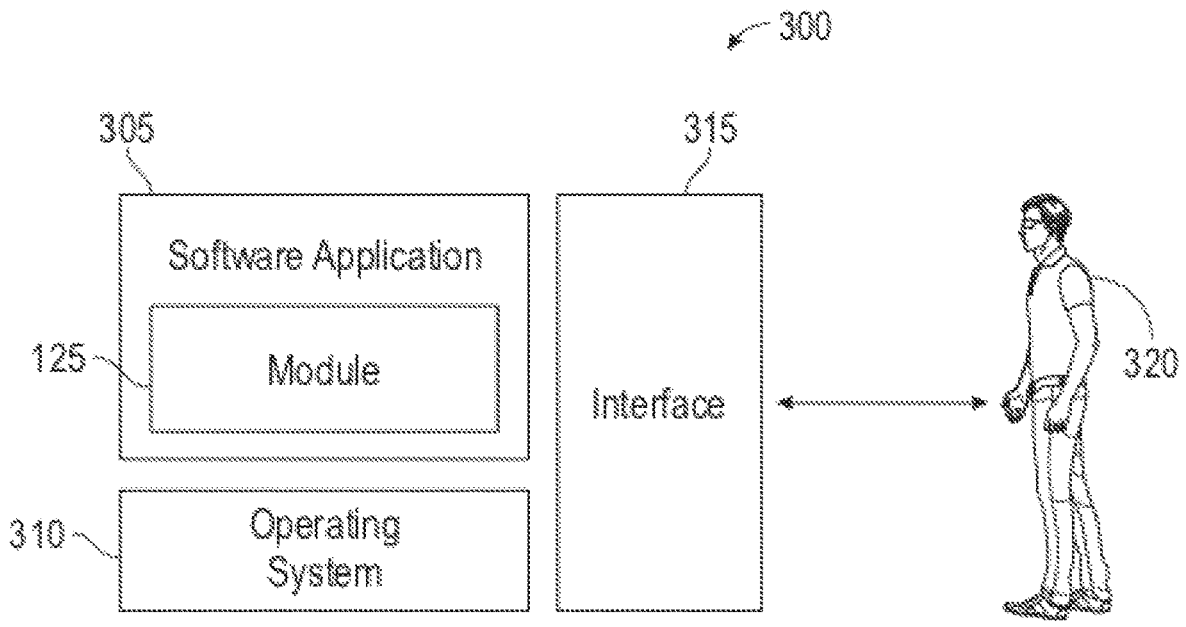
Figure 4:
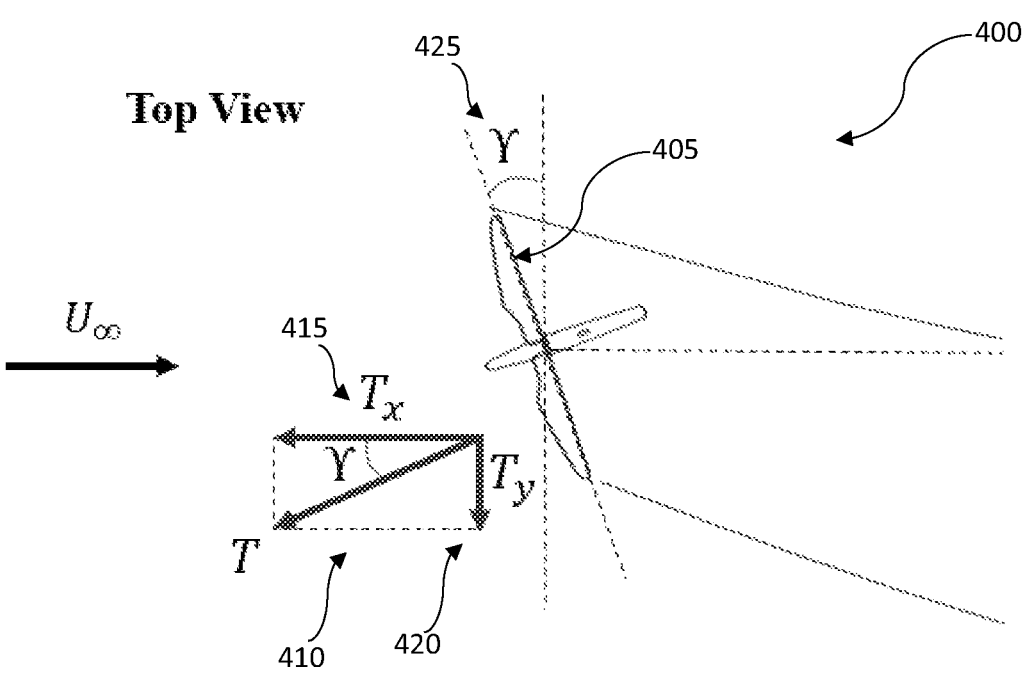
Figure 5:
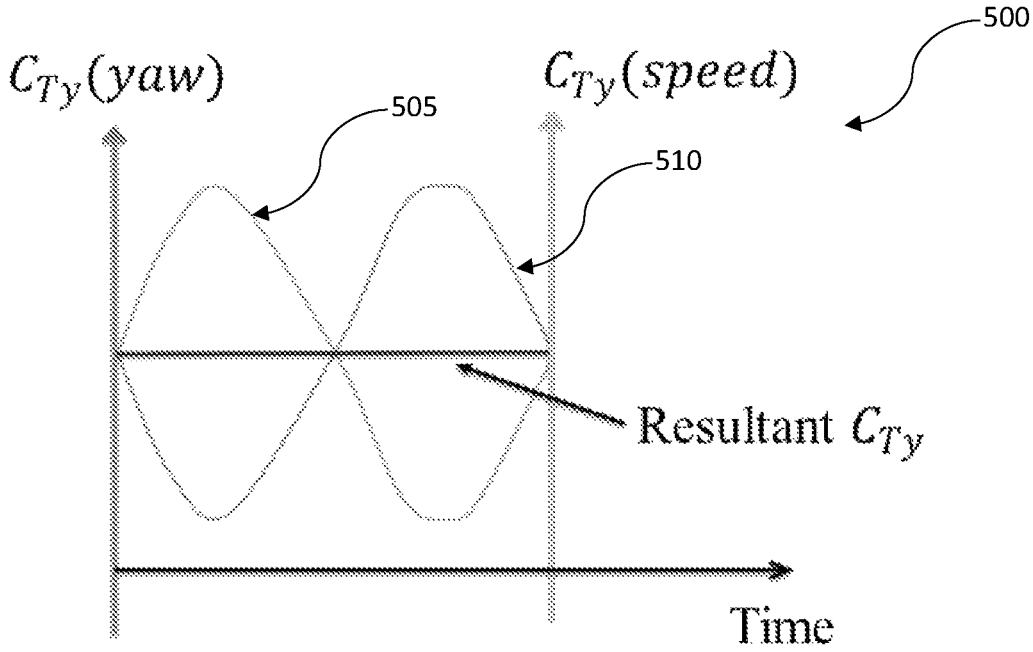
Figure 6:
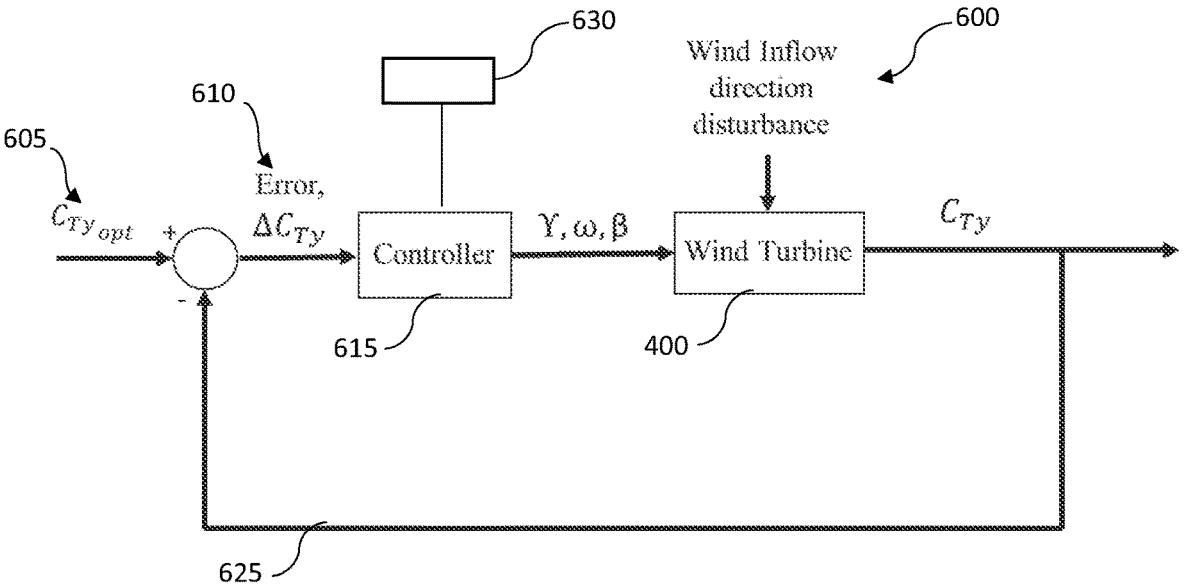
Figure 7:
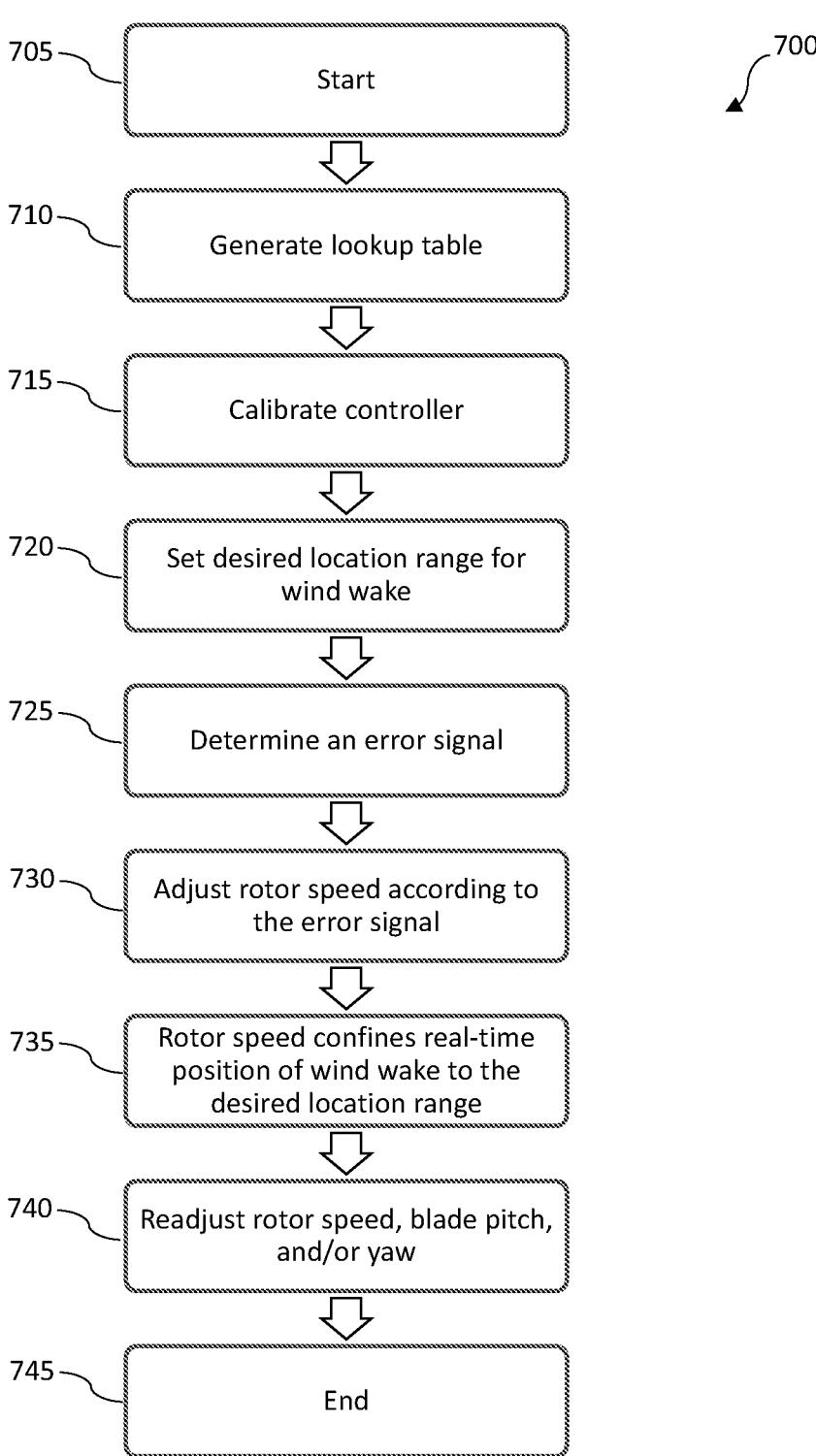
Figure 8A:
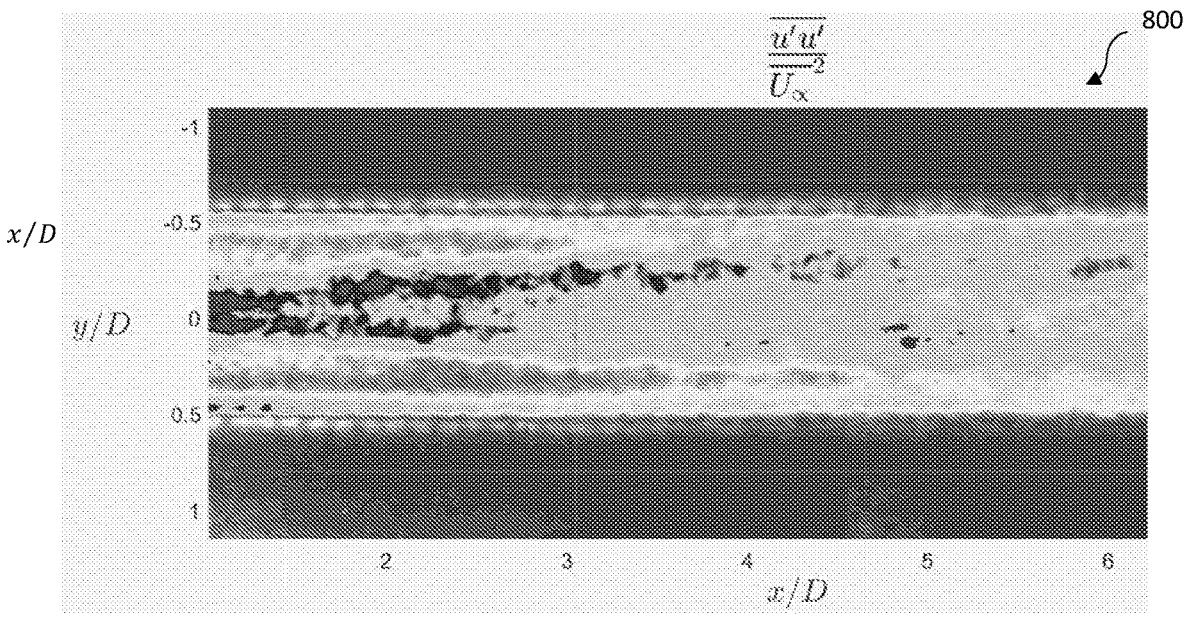
Figure 8B:
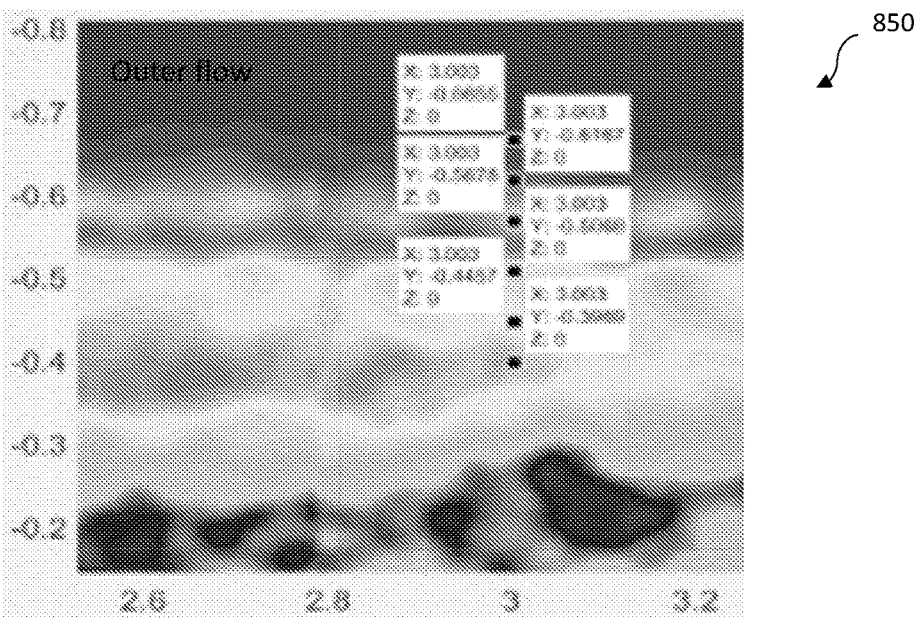
Figure 9:
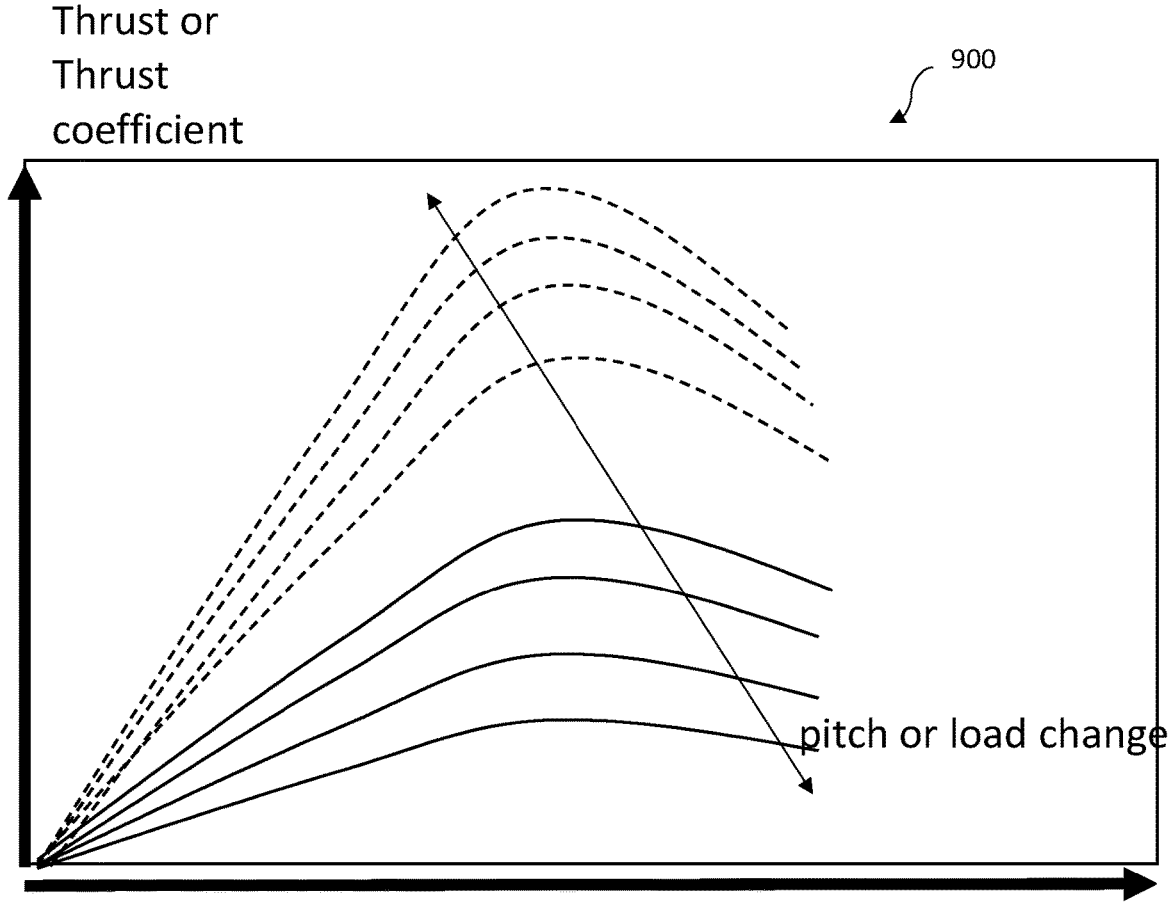
Figure 10A:
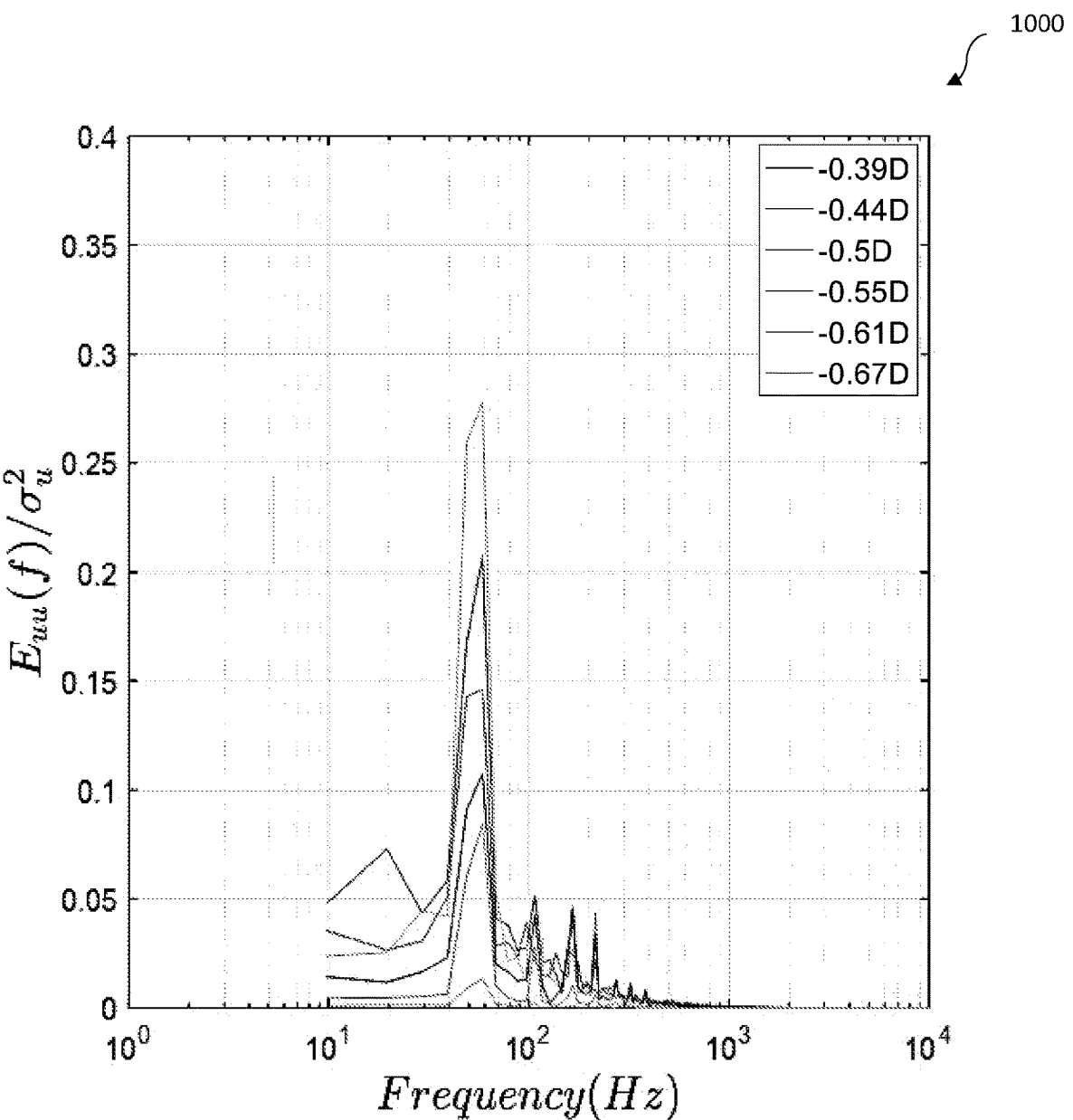
Figure 10B:
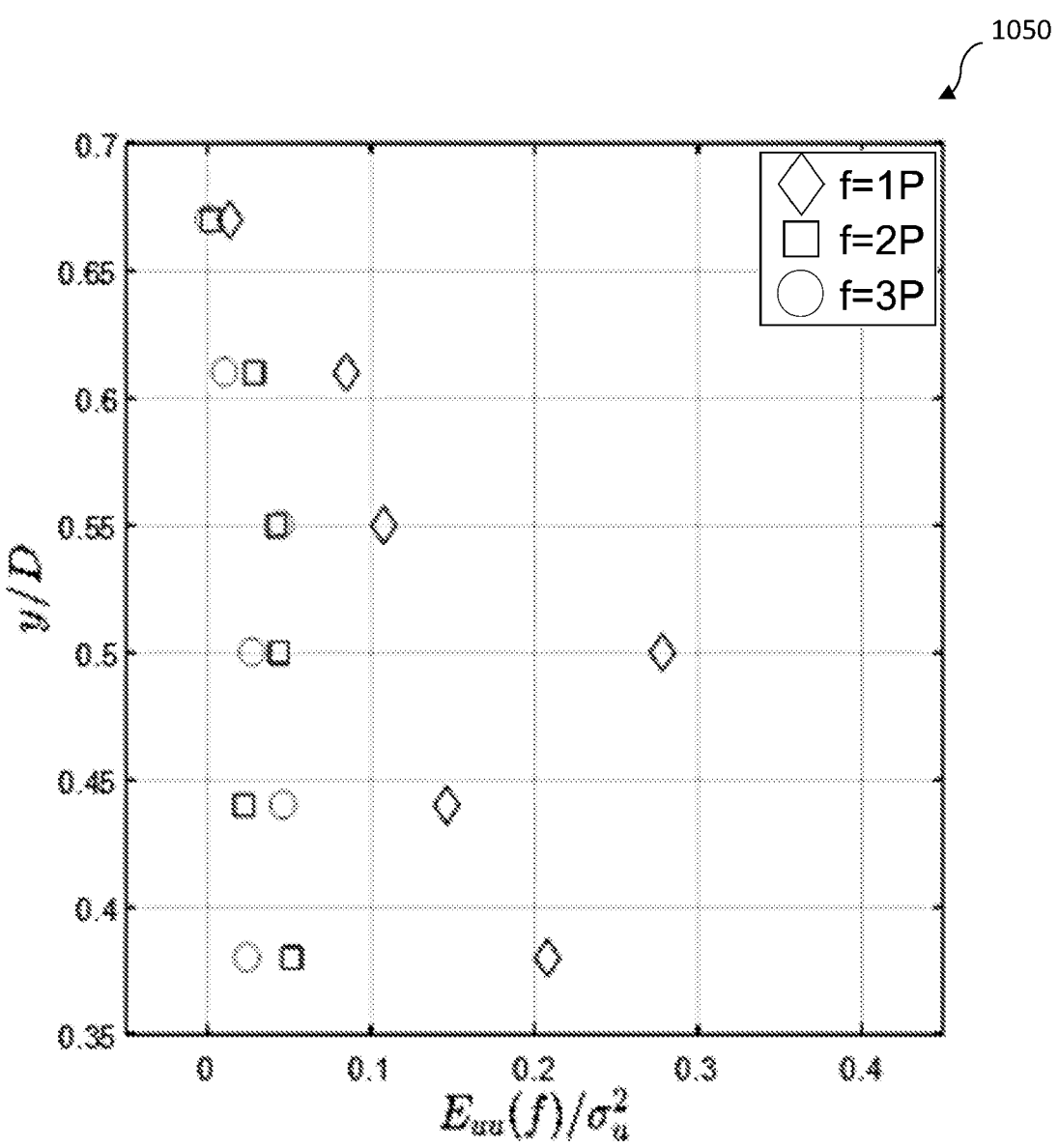
Figure 11:
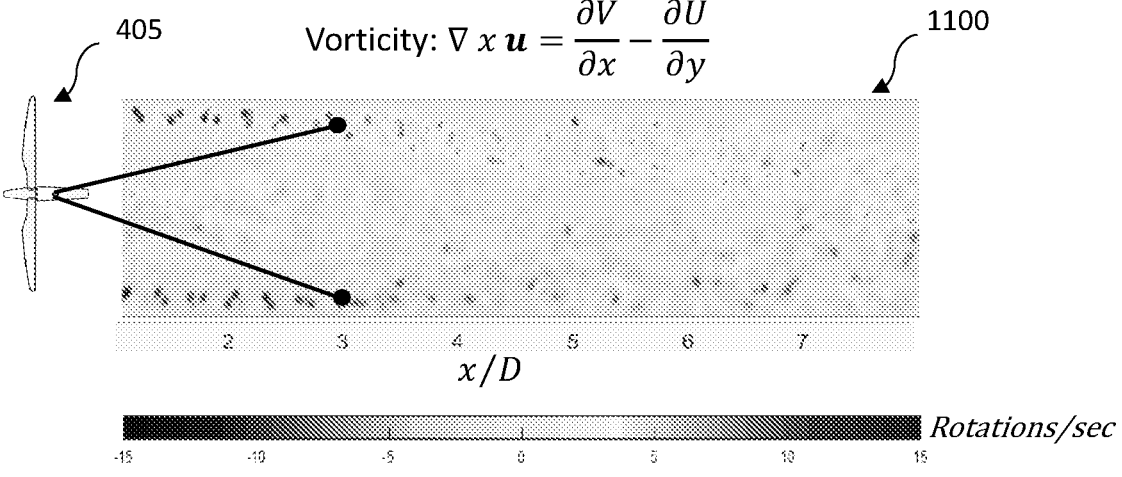
Figure 12:
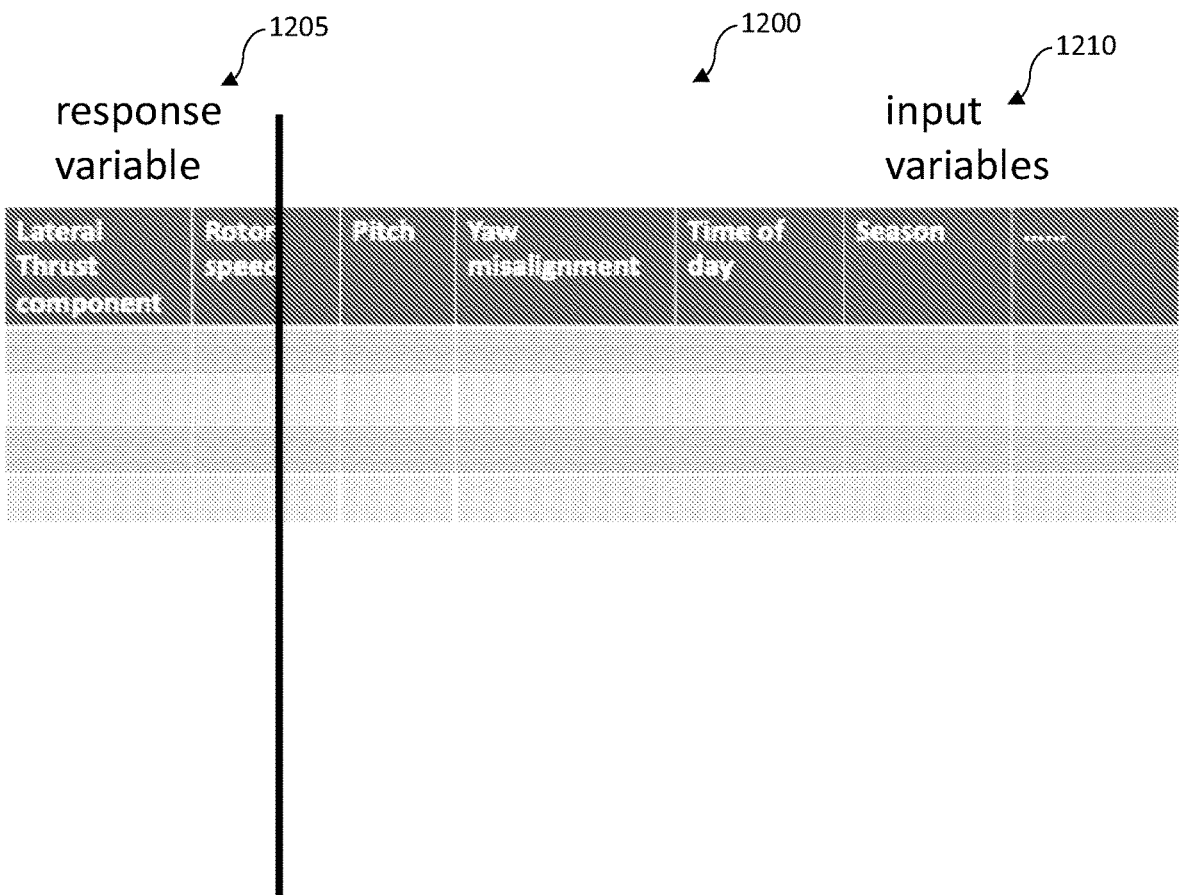
Figure 13:
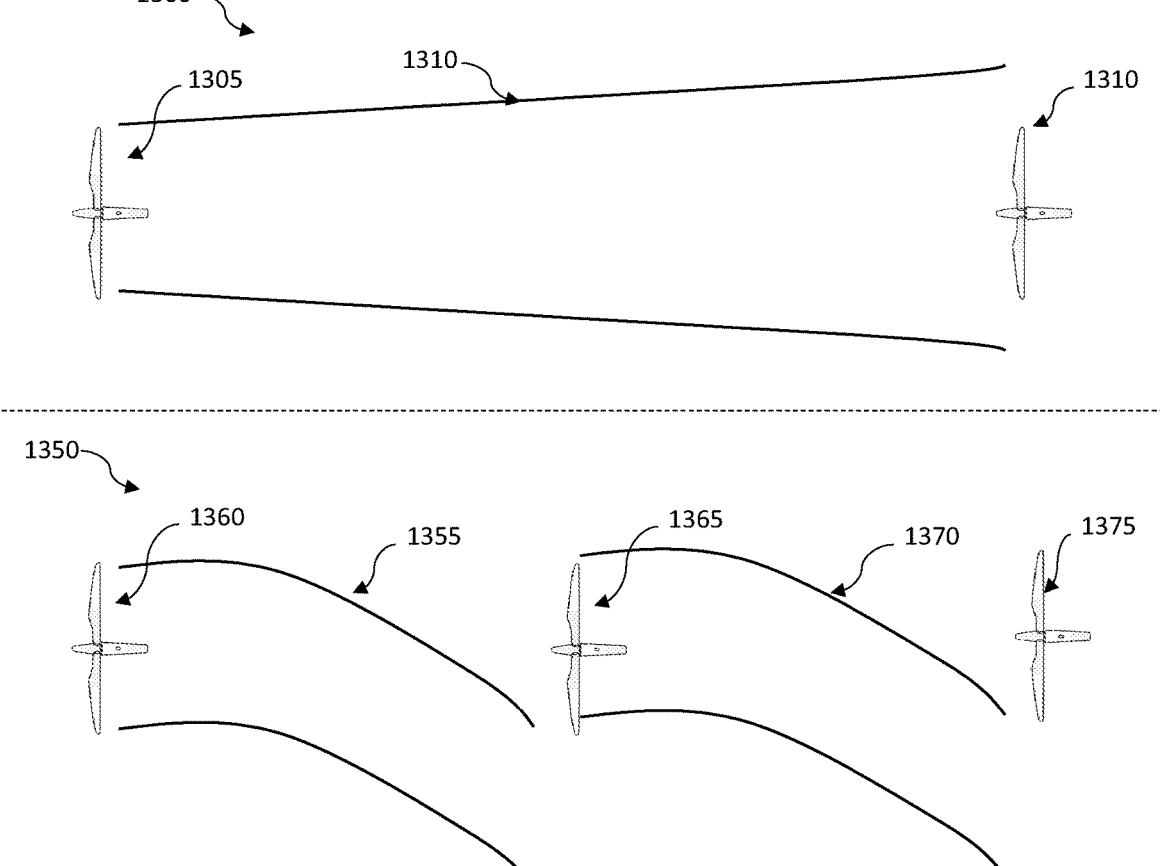

FIG. 1 depicts a block diagram of a computer system which is implemented in accordance with the disclosed embodiments;

FIG. 2 depicts a graphical representation of a network of data-processing devices in which aspects of the present embodiments may be implemented;

FIG. 3 depicts a computer software system for directing the operation of the data-processing system depicted in FIG. 1, in accordance with an example embodiment;

FIG. 4 depicts wind turbine system, in accordance with the disclosed embodiments;

FIG. 5 depicts chart of rotor yaw and speed, in accordance with the disclosed embodiments;

FIG. 6 depicts a system for maximizing wind turbine efficiency, in accordance with the disclosed embodiments;

FIG. 7, depicts a high level flow chart of steps associated with a method for controlling wind wake location, in accordance with the disclosed embodiments;

FIG. 8A depicts a chart of wake interface location taken with particle image velocimetry, in accordance with the disclosed embodiments;

FIG. 8B depicts an exploded view of a portion of the chart of wake interface location taken with particle image velocimetry, in accordance with the disclosed embodiments;

FIG. 9 depicts a chart of thrust vs. rotor speed, in accordance with the disclosed embodiments;

FIG. 10A depicts a chart illustrating spectral characteristics across a wake interface, in accordance with the disclosed embodiments;

FIG. 10B depicts a chart illustrating spectral characteristics across a wake interface, in accordance with the disclosed embodiments;

FIG. 11 depicts a power spectrum of vortices, in accordance with the disclosed embodiments;

FIG. 12 depicts an exemplary lookup table, in accordance with the disclosed embodiments; and FIG. 13 depicts increased turbine density achievable with wake control, in accordance with the disclosed embodiments.

DETAILED DESCRIPTION

The particular values and configurations discussed in the following non-limiting examples can be varied, and are cited merely to illustrate one or more embodiments, and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

FIGS. 1-3 are provided as exemplary diagrams of data-processing environments in which embodiments of the present embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

In an embodiment, a system for wind turbine optimization comprises a processor and a computer-usable medium embodying computer code, said computer-usable medium being coupled to said processor, said computer code comprising non-transitory instruction media executable by said processor configured for: setting a desired location range of a wind wake with a controller; determining an error signal; adjusting a speed of a rotor associated with a wind turbine according to the error signal; and confining a real-time position of the wind wake to the desired location range of the wind wake. In an embodiment, the computer code comprising non-transitory instruction media executable by said processor can be configured for generating a look up table of a yaw misalignment angle and a rotor speed. The computer code comprising non-transitory instruction media executable by said processor can be configured for calibrating the controller with the look up table. Calibrating the controller can be done with data obtained from at least one of: analytically derived relationships; numerical simulations; experiments on models in wind tunnels; and scaled or full-scale models installed in field conditions using regression methods. In an embodiment, the regression methods comprise at least one of linear modeling and supervised machine learning. The computer code comprising non-transitory instruction media executable by said processor can be configured for prescribing controller variables in response to changes in cross-stream thrust using unsupervised machine learning. In an embodiment, the controller variable comprises at least one of: pitch, yaw, and speed. In an embodiment, the error signal comprises a difference between a currently measured cross-stream thrust component of wind and an optimal cross-stream thrust component of wind. The computer code comprising non-transitory instruction media executable by said processor can be configured for readjusting at least one of the rotor speed, blade pitch, or yaw to minimize the difference between the currently measured cross-stream thrust component of wind and the optimal cross-stream thrust component of wind. In an embodiment, setting the desired location range of a wind wake with a controller further comprises selecting the desired location range to maximize efficiency of a wind farm comprising a plurality of wind turbines. The computer code comprising non-transitory instruction media executable by said processor can be configured for reducing levelized cost of energy by at least one of, increasing turbine density at a given site and adding turbines of different types to stabilize wake trajectory.

In an embodiment, a wind turbine optimization method comprises setting a desired location range of a wind wake with a controller, determining an error signal, adjusting a speed of a rotor associated with the wind turbine according to the error signal, and confining a real-time position of the wind wake to the desired location range of the wind wake. In an embodiment, the method comprises generating a look up table of a yaw misalignment angle and a rotor speed. In an embodiment, the method comprises calibrating the controller with the look up table. In an embodiment, the method comprises calibrating the controller with data obtained from at least one of: analytically derived relationships, numerical simulations, experiments on models in wind tunnels, and scaled or full-scale models installed in field conditions using regression methods. In an embodiment, the method comprises prescribing, machine learning, wherein the controller variables comprise at least one of: pitch, yaw, and speed. In an embodiment, the error signal comprises a difference between a currently measured cross-stream thrust component of wind and an optimal cross-stream thrust component of wind. In an embodiment, the method comprises readjusting at least one of rotor speed, blade pitch, or yaw to minimize the difference between the currently measured cross-stream thrust component of wind and the optimal cross-stream thrust component of wind. In an embodiment, the method comprises mitigating wake meander from a trajectory that is set due to instantaneous changes in inflow wind conditions. In an embodiment, the method comprises mitigating adverse loads on the wind turbine due to instantaneous yaw misalignments caused by changes in inflow wind conditions, the inflow wind conditions comprising at least one of: wind direction, speed, and atmospheric stratification. In an embodiment, the method comprises constructing a labeled dataset of wake trajectory in response to changes of control variables comprising pitch, yaw, and speed. In an embodiment, the labeled data set is derived from at least one of: a scaled model tested in a wind tunnel, computational fluid dynamics, and full-scale model tested in field settings. In an embodiment, the method comprises designing turbine blades associated with the wind turbine, such that the turbine rotor has a sufficient thrust response to changes in pitch, yaw, and/or speed. In an embodiment, the method comprises designing the turbine blades such that a rotor has a peak coefficient of thrust occurring at a tip speed ratio that is higher than an operating tip speed ratio. In an embodiment, the method comprises designing the turbine blades such that a rotor solidity is higher than an optimal design. In an embodiment, the method comprises directly measuring wake trajectory deviations by measuring velocity time-series signal spectral energy amplitude changes at a period equivalent to integral multiples of a complete rotation. In an embodiment, the method comprises directly measuring wake trajectory deviations by measuring frequency changes of velocity time-series signal spectral energy peak occurrences. In an embodiment, the method comprises estimating wake trajectory on a full-scale model using wind tunnel-scale models tested in wind tunnel.

In another embodiment, an apparatus for wind turbine optimization comprising: a wind turbine, a processor, and a computer-usable medium embodying computer code, said computer-usable medium being coupled to said processor, said computer code comprising non-transitory instruction media executable by said processor configured for: calibrating the controller with data obtained from at least one of: analytically derived relationships, numerical simulations, experiments on models in wind tunnels, and scaled or full-scale models installed in field conditions using regression methods; setting a desired location range of a wind wake with a controller; determining an error signal; adjusting a speed of a rotor associated with the wind turbine according to the error signal; and confining a real-time position of the wind wake to the desired location range of the wind wake.

A block diagram of a computer system 100 that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, actuators, speakers, "internet of things" devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a detector device, controller, receiver, transmitter, transceiver, transducer, driver, signal generator, some combination thereof, or other such device.

In the depicted example, device 204, server 206, and clients 210, 212, and 214 connect to network 202 along with storage unit 208. Clients 210, 212, and 214 may be, for example, personal computers or network computers, hand-held devices, mobile devices, tablet devices, smart phones, personal digital assistants, controllers, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module), and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, LabView and the like. Therefore, the descriptions of the exemplary embodiments, which follow, are for purposes of illustration and not considered a limitation.

The embodiments disclosed herein are directed to methods and systems for turbine wake steering. In certain embodiments, wake trajectory can be measured using turbine operation parameters including but not limited to speed, yaw heading, and pitch. In additional embodiments, methods and systems can be used to direct or hold wake trajectory at a desired location in response to changing inflow conditions using turbine operation parameters such as, but not limited to speed, yaw heading, and pitch without use of direct measuring tools such as lidars etc. The disclosed methods and systems can affect the lateral (and axial) thrust component of the wake via turbine operation parameters such that they have a cancelling or additive effect on the lateral (and axial) thrust component. As such, the disclosed embodiments improve wind plant power output, in particular during low wind speeds.

FIG. 4 illustrates a schematic of the forces exerted on the wake of a yawed turbine 400. Under yawed conditions, the thrust force T 410 exerted by the wind on the turbine rotor 405 has two components Tx 415 and Ty 420 as depicted in FIG. 4. Note that the following description illustrates a two-dimensional wake trajectory deflection scenario, however, this explanation can be generalized to three-dimensional wake trajectory deflection. Tx 415 is parallel to the inflow wind direction causing the wake. Ty 420 is orthogonal to inflow or in the cross-stream direction and is highly correlated with the wake trajectory deflection. This should be expected and is reasonable as the rotor 410 reaction force will be aligned orthogonally to the rotor plane which is yawed in relation to inflow. Since the thrust force component Ty 420 is affected by the yaw angle offset Y 425, the degree of wake trajectory deflection is predominantly proportional to Y 425 for the same inflow wind speeds and optimal turbine operation conditions.

The optimal cross-stream thrust component coefficient, to achieve a prescribed extent of wake steering, is given by $C_{Ty,opt}$. However, the instantaneous inflow direction will deviate from the prevalent mean direction, giving rise to instantaneous variations of the cross-stream thrust component $C_{Ty}$ and thus $C_{Ty} \neq C_{Ty,opt}$. To illustrate this effect, FIG. 5 shows a chart 500, of the instantaneous $C_{Ty}$ variation 505 responding to sinusoidal yaw misalignment 510 represented by equations (1) and (2):

$$Y(t) = Y_{opt} + Y_a \sin(2\pi f t) \qquad (1)$$

$$C_{Ty}(t) = C_{Ty,opt} + C_{Ty,a} \sin(2\pi f t) \qquad (2)$$

where $Y_a$ and $C_{Ty,a}$ are the amplitude of the fluctuating components of the resulting Y and $C_{TY}$, respectively and f is the perturbation frequency. In practice, yaw misalignment will not follow a simple sinusoidal pattern, instead it will respond to turbulent inflow wind direction change. As a result, the wake will fluctuate around the desired position in response to $C_{Ty}$ fluctuations. Given that $C_T$ and hence $C_{Ty}$ are also a function of the tip speed ratio $\lambda$, the rotor speed $\omega$ can be manipulated such that it has an additive or cancelling effect on the fluctuating component of $C_{Ty}$.

For example, if rotor speed $\omega$ creates a counteracting $C_{Ty}$ effect, then the required $\omega$ variation is represented by equation (3):

$$\omega(t) = \omega_{opt} + \omega_a \sin(2\pi f t + \varphi) \qquad (3)$$

$\omega_a$ is the amplitude of the fluctuating component of the resulting $\omega$ and $\varphi$ is the appropriate phase shift relative to Y. FIG. 5, provides chart 500 illustrating instantaneous $C_{Ty}$ variation 505 responding to sinusoidal $\omega$. In chart 500, it is assumed that $C_{Ty}$ changes due to Y and $\omega$ are equivalent. As a result, $C_{Ty}$ due to Y and $\omega$ respectively are superimposed with a phase difference, $\varphi=180°$ such that the resulting $C_{Ty}$ 510 resembles $C_{Ty,opt}$. Here (in this illustrative example), influence of inflow turbulence, blade pitch angle, and rotor tilt angle on $C_{Ty}$ are not considered. However, chart 500 illustrates a fundamental principle of the disclosed embodiments, which is that control of lateral thrust $C_{Ty}$ can be used to steer the wake associated with a turbine such as turbine 400.

FIG. 6 illustrates a block diagram of a control system 600 in accordance with the disclosed embodiments. It should be understood that certain aspects of the system 600 and associated method can be implemented using a computer system such as computer system 100.

As illustrated, the optimal cross-stream thrust coefficient $C_{Ty,opt}$ is the input 605 used to locate the wake at the desired position. Due to the inflow direction disturbance, there will be a difference between $C_{Ty,opt}$ and the instantaneous measured $C_{Ty}$ producing an error signal 610. A controller 615, can be used to alter rotor speed (or pitch β) of wind turbine 400 and hence in $C_{Ty}$ in proportion to this error, $\Delta C_{Ty}$, leading to a new $C_{Ty}$. The new $C_{Ty}$ confines the lateral wake trajectory to the desired position or range of positions. The magnitude of the counteracting action can be determined by performing Cry calibration tests for known Y or $\omega$ inputs which can be summarized in a lookup table and stored in a computer system 100 associated with controller 615, for applying correction until $C_{Ty}=C_{Ty,opt}$ through the closed-loop control 625 as illustrated in FIG. 6. In certain embodiments, a LIDAR 630 can be used to collect LIDAR measurements which can be used to obtain wake trajectory measurements to confirm the $C_{Ty}$ effect on full-scale.

In certain embodiments, the table can comprise a labeled dataset, of wake trajectory and load in response to changes of control variables, such as pitch, yaw, and speed, in a timely manner using controlled experiments of a scaled model tested in a wind tunnel. FIG. 12 illustrates an exemplary table 1200, which includes input variables 1210 and response variables 1205. The table can also comprise a labeled dataset, of wake trajectory in response to changes of control variables, such as pitch, yaw, and speed, in a timely manner using controlled experiments of a model tested using numerical tools, such as, but not limited to, computational fluid dynamics. In certain embodiments, the table can further comprise a labeled dataset, of wake trajectory in response to changes of control variables, such as pitch, yaw, and speed, in a timely manner using controlled or uncontrolled experiments of a full-scale model tested in field settings.

Ultimately, controlling $C_{Ty}$ minimizes the wake trajectory oscillation around the desired position. Since the turbine 400 wake evolves over downstream distance, a change in rotor speed at time $t_o$ will affect the wake at distance x at a later time, given by equation (4) as:

$$t = t_o + \frac{x}{U_\infty} \tag{4}$$

which thus defines total system response time. This is important where the system is configured in a wind farm where downstream wake trajectory will affect the efficiency of downstream wind turbines. For full-scale turbines, this is usually t>30 seconds, which is significantly higher than w change response time.

It should be further noted that the system 600 can also be used to correct yaw-misalignments caused by incorrect nacelle mounted yaw-heading measurement. Such incorrect yaw-heading angles will lead to $C_{Ty} \neq 0$ (for example in a simplified, ideal scenario). The above $C_{Ty}$ control method can be applied by compensating solely based on yaw correction such that $C_{Ty}=0$.

In certain embodiments, the disclosed systems and methods can be used to correct wind turbine yaw-misalignments caused by incorrect nacelle mounted yaw-heading measurement or due to inflow variations. The systems and methods can thus reduce load fluctuations on the turbines or other turbines in vicinity.

FIG. 7 illustrates a high level method 700 for wind wake control in accordance with the disclosed embodiments. The method begins at 705.

In certain embodiments, at step 710 preliminary steps can include generating a look up table, as further detailed herein, of yaw misalignment angle and/or rotor speed. At step 715, the method can further include calibrating a controller. The controller can comprise computer hardware and/or software as illustrated herein.

Calibration can be completed with the look up table, or with other methods. For example, in some embodiments, the controller can be calibrated with data obtained from analytically derived relationships, numerical simulations, experiments on models in wind tunnels, and/or scaled or full-scale models installed in field conditions using regression methods. Such regression methods can include linear modeling and supervised machine learning.

Once the controller is calibrated, at step 720, the controller can be used to set a desired location range of a wind wake from a wind turbine. The desire to control the location range of wind wake can be for example, because the wind wake can be deleterious to the performance of a downstream wind turbines. Thus, in certain embodiments, the desired location range of the wind wake is selected to maximize efficiency of a wind farm comprising a plurality of wind turbines.

Next, at step 725 the system can be used to determine an error signal. In certain embodiments the error signal comprises a difference between a currently measured cross-stream thrust component of wind and an optimal cross-stream thrust component of wind.

The error signal can be used to adjust the speed of the rotor associated with the wind turbine at step 730. The error signal can be the difference between the currently measured cross-stream thrust component of wind and the optimal cross-stream thrust component of wind. Adjusting the speed of the wind turbine can be used to confine the real-time position of the wind wake to the desired location range of the wind wake as shown at step 735. In certain cases, the method can make use of prescribed controller variables in response to changes in cross-stream thrust using unsupervised machine learning. The controller variables can include pitch, yaw, speed, or other such variables.

In certain embodiments, at step 740 the method includes readjusting rotor speed, blade pitch, or yaw to minimize the difference between the currently measured cross-stream thrust component of wind and the optimal cross-stream thrust component of wind. The method ends at step 745.

The disclosed embodiments provide an innovative approach of adjusting yaw, speed, and blade pitch of a wind turbine individually or as a combination, which is of particular value for wind turbines in a wind farm. Direct thrust measurement as well as detailed particle image velocimetry (PIV) wake data show that this approach can successfully suppress the cross stream thrust and wake trajectory meandering. The combined control of yaw and speed (in addition to blade pitch as needed) is a viable avenue in wind farms for improved power generation.

The following example is provided for exemplary purposes and is not meant to be limiting to the scope of the embodiments disclosed herein. Consider the case where a turbine is required to hold a fixed yaw-misaligned wake position. This scenario is relevant in common wind farm configurations where turbine locations are fixed and the inflow wind direction deviates. It should be appreciated that although mean wind direction may be constant, the instantaneous inflow direction will not be a constant. As a result, the wake will oscillate around the desired location in response to $C_{Ty}$ changes. This variation can be measured or predicted for specific turbine design. The prediction can be arrived at by simple regression-based models or more sophisticated machine learning algorithms. $C_{Ty}$ is also a function of speed change, so the turbine speed can be varied such that it has a cancelling effect on Cry.

The primary reason for wake steering is the cross stream thrust component (Ty) that increases in magnitude in proportion to the yaw misalignment. In addition, changing turbine speed affects the total thrust (T). Furthermore, speed change (at fixed non-zero yaw misalignment) also affects the cross stream thrust component. Thus, it is possible to characterize wake location (and Ty or coefficient of Ty, $C_{Ty}$) as a function of turbine operating conditions. In certain embodiments, the disclosed methods and systems can be tailored to a specific turbine. For a specific turbine design data tables can be created. Given the behavior of $C_{Ty}$ (coefficient of Ty or Ty) as a function of the turbine operation conditions, this wake trajectory dictating parameter $C_{Ty}$ can be modified. The turbine operating conditions can be changed to have an additive or cancelling effect on $C_{Ty}$ so that the wake can be directed to or held at a desired location.

Mitigation of wake meander from a trajectory can be set using yaw or other parameters, due to instantaneous changes in inflow wind conditions which include but are not limited to wind direction, speed, or atmospheric stratification. Likewise, mitigation of adverse loads on the wind turbine due to instantaneous yaw misalignments is possible. Such misalignments can be caused by instantaneous changes in inflow wind conditions such as wind direction, speed, or atmospheric stratification.

In certain embodiment, a downstream turbine under low wind speed conditions can be used to effectively divert and hold an upstream turbine wake trajectory under instantaneous, changing wind flow conditions such that it does not impact the downstream turbine that will otherwise reduce the inflow to the downstream turbine.

The disclosed embodiments can also be used for mitigating adverse, fluctuating loads on a downstream turbine by more effectively diverting and holding an upstream turbine wake trajectory under instantaneous, changing wind flow conditions such that it does not impact the downstream turbine that will otherwise be within a wake region of an upstream turbine.

In certain embodiments, the methods and systems disclosed herein are further directed to wake detection. In the disclosed embodiments, the cross-stream dynamics of the wake interface, characterized by the presence of the tip vortices shed by the blade tips, can be used as a primary metric.

FIGS. 8A and 8B depicts a chart 800 of wake interface location taken with particle image velocimetry, and an exploded view 850 of a portion of the chart of wake interface location taken with particle image velocimetry, Wake interface location can be measured using measurement methods such as a hotwire probe anemometers or Particle Image Velocimetry as shown in chart 800 and exploded view 850 or using Lidars or sonic anemometers in field settings.

The tip-vortex-based tracking approach includes power spectral density PSD analysis performed with hot-wire anemometers located across the wake interface. Spectral energy depending on turbine dimensions and operating conditions, at one-per-revolution 1P, at one-per-revolution 2P, or at one-per-revolution 3P will dominate the strength of the streamwise velocity fluctuation at certain stream wise distance such as x/D=3, exhibiting a significant variation across the wake interface. Therefore, it is necessary to track the instantaneous magnitude of the streamwise 1P (or 2P or 3P) peaks $E_{uu}(t)|_{f=1P}$ as the wake interface oscillates around a single measurement point. Alternatively, change in frequency corresponding to spectral peaks can be used to measure the tip vortex location relative to the velocity measurement location. This behavior can be correlated with changes in $C_{Ty}$ induced by variation in yaw and/or rotor speed. Finally, a sum of square difference (R-square) technique (given by equation (5)) can be used to statistically analyze how whether the control method is effectively delivering wake steering.

$$R^2 = \sum_{t=0}^{mT_p} \left( \frac{E_{uu}(t)}{\sigma_u^2}\bigg|_{f=1P}^{Y_a,\omega_a} - \frac{E_{uu}(t)}{\sigma_u^2}\bigg|_{f=1P}^{Y_a=0,\omega_a=0} \right)^2 \quad (5)$$

where $T_p$ is the perturbation period and m is the number of cycles.

The wake trajectory stabilization method described herein thus involves creating wake trajectory fluctuations in response to prescribed perturbations to counter the undesired fluctuations.

The disclosed methods and systems can further be implemented in conjunction with various modifications to wind turbine systems to achieve improved efficiency. One such example is turbine blade design. Blade design can be tailored to achieve effective wake control. FIG. 9 illustrates a chart 900 illustrating thrust vs. rotor speed. The dotted lines represent increased rate of change of thrust with changing operating parameters. Blades with such characteristics may offer better results with the thrust-based wake control methods disclosed herein.

Wake steering (and stabilization) is the result of controlling the cross-stream thrust component. To limit the required amplitude of control parameters, such as yaw misalignment, pitch change, or speed change that affect wake steering (or stabilization), within reasonable ranges, a rotor design that has higher magnitude thrust response to change in control parameters will be beneficial to achieve the desired level of wake control.

For example, the cross-stream thrust variation results in changes in yaw misalignment and tip speed ratio. The wake stabilization scheme is most effective when the operation end points are chosen such that a maximum difference in cross-stream thrust is achieved with minimum effect turbine power production. This can be achieved in practice by designing turbine blades with airfoils that result in high rotor thrust response, deliberately increasing design tip-speed ratio. This could require a tradeoff as the system must operate at a suboptimal tip-speed ratio, thereby sacrificing some turbine performance, or pitching the blades or changing yaw such that rotor thrust is increased.

In certain embodiments, the systems/methods can comprise designing turbine blades such that the turbine rotor has high thrust response to changes in pitch, yaw, or speed to increase the effectiveness of the method. A high thrust response for a rotor is achieved by designing the turbine blades such that the rotor has peak coefficient of thrust occurring at a tip speed ratio that is higher than operating tip speed ratio. A high thrust response for a rotor can also be achieved by designing the turbine blades such that the rotor solidity is higher than that of the optimal design.

Likewise, parameter optimization can further improve overall system efficiency. A careful control parameter balance is required to realize the benefits of wake control. For example, there are circumstances where wake control in the form of steering may not be beneficial. For example, if the inflow wind direction changes at a faster rate than the turbine yaw change rate, yaw misalignment wake steering may be ineffective. Further, yaw misalignment reduces the turbine performance coefficient affecting power production and increases loads since the turbine may be operating at non-optimal yaw misalignment. Thus, a wake stabilization strategy described herein can include selecting the optimal control parameter amplitude range. This parameter amplitude range can be determined using, analytical methods, and data generated by numerical computational fluid dynamics (CFD) methods, field studies, or control studies in wind tunnels, in order to identify optimal control parameter combination, amplitude, and actuation frequency. The chart 1200 shows variables whose data can be used to create a ML model to achieve the desired lateral thrust component to stabilize wake trajectory.

For example, an experimental wind tunnel platform, can be used to test a range of control parameters and the associated varying wake control performance. A combination of control parameters will be employed for wake stabilization approaches. As such, principal component analysis or other analytical tools, can be used to reduce the parameter space. Further, the parameter range can be treated with explanatory variables, with a supervised learning approach, such as, but not limited to, random forest regression, which can be applied to arrive at optimal parameter values. The response variable will be the performance of the wind farm from either a power generation or a load reduction point of view. Additionally, the feature engineering can be implemented to improve machine learning accuracy. Amongst, unsupervised methods, such as, but not limited to, K-means clustering can be employed to create either a new engineered feature or assignment of a response variable. Separately, neural networks can be employed to obtain relationships between wake control performance and control parameter or to obtain new features (new independent variables created using existing independent variables).

It should be noted that in certain embodiments, the controller can be calibrated with the data obtained from analytically derived relationships, numerical simulations, experiments on models in wind tunnels, or scaled or full-scale models installed in field conditions using regression methods ranging from linear models to supervised machine learning techniques. Controller variables such as pitch, yaw, and speed can be prescribed in response to changes in cross-stream thrust using unsupervised machine learning techniques such as but not limited to neural networks.

As noted, calibration procedures can include directly measuring the wake trajectory deviations by measuring velocity time-series signal spectral energy amplitude changes at period equivalent to complete 1 rotation (1P) or integral multiples (2p, 3p, and so on) measured using, Lidars or other such equipment. Calibration can also be performed by directly measuring the wake trajectory deviations by measuring frequency changes of velocity time-series signal spectral energy peak occurrences measured using, Lidars or other such equipment. Calibrating procedure can also include estimating wake trajectory on a full-scale model using wind tunnel-scale models tested in wind tunnels or with simulation tools.

Thrust-based wake trajectory stabilization systems and methods are presented herein. The disclosed embodiments can be used to stabilize wake oscillation caused by inflow variation. Further, the embodiments can be used to correct yaw-misalignment. Wind turbine yaw-based wake steering strategies incorporate dynamic cancellation of the thrust coefficient to reduce wake deflection oscillation due to variable inflow direction. Wake stabilization can be achieved by controlling yaw, speed, pitch, or some combination thereof such that $C_{Ty}=C_{Ty,opt}$. The disclosed systems and methods have been tested and validated using a wind tunnel-based platform, known as a HAWKS platform. Testing demonstrated that yaw-based wake steering statically applied in combination with rotor speed control effectively counteracted the dynamic thrust induced by variable inflow direction, reducing the wake trajectory oscillation around a desired position imposed by static yaw.

Furthermore, conventional wisdom previously suggested that LIDAR measured wake trajectory is required as an input to the closed-loop wake trajectory control strategies. However, the according to the disclosed systems and methods wake trajectory stabilization can be achieved without the use of LIDAR or another direct measurement to locate the wake. Such, direct measurement instruments can be used during thrust-based system calibration. However, they are not required during operation.

As disclosed above, wake interface location can be measured using measurement methods such as a hotwire probe anemometers or Particle Image Velocimetry as shown in chart 800, or using Lidars or sonic anemometers in field settings. For example, FIG. 11 illustrates power spectrum 1105 associated with a turbine 405. Hot-wires can be used to emulate the tip vortex detection function of the nacelle-mounted LIDAR. To detect the tip vortices, the power spectrum of the velocity time series as illustrated, can be analyzed.

FIG. 10A illustrates chart 1000, and FIG. 10B illustrates chart 1050, which provide comparisons of spectral characteristics across the wake interface at x/D=3: with PSD in chart 1000 and 1, 2, and 3 P spectral energy in chart 1050.

Accordingly, in certain embodiments the methods disclosed herein further comprise directly measuring wake trajectory deviations by measuring velocity time-series signal spectral energy amplitude changes at a period equivalent to integral multiples of a complete rotation. The methods can also comprise directly measuring wake trajectory deviations by measuring frequency changes of velocity time-series signal spectral energy peak occurrences.

FIG. 13 illustrates a comparison of a traditional wind wake as compared to the embodiments disclosed herein. System 1300 illustrates a first turbine 1305 with a wind wake 1310 directly aligned with a second turbine 1315.

The disclosed embodiments provide an increase in turbine density as illustrated by system 1350. In such an embodiment, the wind wake 1355 from turbine 1360 is directed away from turbine 1365. Similarly, the wind wake 1370 from turbine 1365 is directed away from turbine 1375. At a site with wake control as disclosed herein, additional turbines can thus be arranged in the same relative area affecting the levelized cost of energy. It should be appreciated that a site with turbines of dissimilar heights is also contemplated which increases development flexibility.

Based on the foregoing, it can be appreciated that a number of embodiments, preferred and alternative, are disclosed herein. For example, in an embodiment, a system for wind turbine optimization comprises a wind turbine, a processor, and a computer-usable medium embodying computer code, said computer-usable medium being coupled to said processor, said computer code comprising non-transitory instruction media executable by said processor configured for: setting a desired location range of a wind wake with a controller, determining an error signal, adjusting a speed of a rotor associated with the wind turbine according to the error signal and confining a real-time position of the wind wake to the desired location range of the wind wake.

In an embodiment, the processor is further configured for generating a look up table of a yaw misalignment angle and a rotor speed. In an embodiment, the processor is further configured for calibrating the controller with the look up table. In an embodiment, the processor is further configured for calibrating the controller with data obtained from at least one of: analytically derived relationships, numerical simulations, experiments on models in wind tunnels, and scaled or full-scale models installed in field conditions using regression methods. In an embodiment, the regression methods comprise at least one of linear modeling and supervised machine learning.

In an embodiment, the processor is further configured for prescribing controller variables in response to changes in cross-stream thrust using unsupervised machine learning. In an embodiment, the controller variable comprise at least one of pitch, yaw, and speed.

In an embodiment, the error signal comprises a difference between a currently measured cross-stream thrust component of wind and an optimal cross-stream thrust component of wind.

In an embodiment, the processor is further configured for readjusting at least one of the rotor speed, blade pitch, or yaw to minimize the difference between the currently measured cross-stream thrust component of wind and the optimal cross-stream thrust component of wind.

In an embodiment, setting the desired location range of a wind wake with a controller further comprises selecting the desired location range to maximize efficiency of a wind farm comprising a plurality of wind turbines.

In an embodiment, a wind turbine optimization method comprises setting a desired location range of a wind wake with a controller, determining an error signal, adjusting a speed of a rotor associated with the wind turbine according to the error signal, and confining a real-time position of the wind wake to the desired location range of the wind wake.

In an embodiment, the method comprises generating a look up table of a yaw misalignment angle and a rotor speed. In an embodiment, the method comprises calibrating the controller with the look up table.

In an embodiment the method comprises calibrating the controller with data obtained from at least one of analytically derived relationships, numerical simulations, experiments on models in wind tunnels, and scaled or full-scale models installed in field conditions using regression methods.

In an embodiment, the method comprises prescribing controller variables in response to changes in cross-stream thrust using unsupervised machine learning, wherein the controller variables comprise at least one of pitch, yaw, and speed.

In an embodiment of the method, the error signal comprises a difference between a currently measured cross-stream thrust component of wind and an optimal cross-stream thrust component of wind.

In an embodiment, the method comprises readjusting at least one of rotor speed, blade pitch, or yaw to minimize the difference between the currently measured cross-stream thrust component of wind and the optimal cross-stream thrust component of wind. In an embodiment the method comprises mitigating wake meander from a trajectory that is set due to instantaneous changes in inflow wind conditions.

In an embodiment the method comprises mitigating adverse loads on the wind turbine due to instantaneous yaw misalignments caused by changes in inflow wind conditions, the inflow wind conditions comprising at least one of wind direction, speed, and atmospheric stratification.

In an embodiment the method further comprises constructing a labeled dataset of wake trajectory in response to changes of control variables comprising pitch, yaw, and speed. the labeled data set can be derived from at least one of: a scaled model tested in a wind tunnel, computational fluid dynamics, and full-scale model tested in field settings.

In an embodiment, the method further comprises designing turbine blades associated with the wind turbine, such that the turbine rotor has a sufficient thrust response to changes in pitch, yaw, and/or speed. In an embodiment, the method comprises designing the turbine blades such that a rotor has a peak coefficient of thrust occurring at a tip speed ratio that is higher than an operating tip speed ratio. In an embodiment, the method comprises designing the turbine blades such that a rotor solidity is higher than an optimal design.

In an embodiment, the method comprises directly measuring wake trajectory deviations by measuring velocity time-series signal spectral energy amplitude changes at a period equivalent to integral multiples of a complete rotation. In an embodiment, the method comprises directly measuring wake trajectory deviations by measuring frequency changes of velocity time-series signal spectral energy peak occurrences.

In another embodiment, the method comprises estimating wake trajectory on a full-scale model using wind tunnel-scale models tested in wind tunnel.

In another embodiment, an apparatus for wind turbine optimization comprises: a wind turbine, a processor; and a computer-usable medium embodying computer code, said computer-usable medium being coupled to said processor, said computer code comprising non-transitory instruction media executable by said processor configured for calibrating the controller with data obtained from at least one of: analytically derived relationships, numerical simulations, experiments on models in wind tunnels, and scaled or full-scale models installed in field conditions using regression methods; setting a desired location range of a wind wake with a controller; determining an error signal; adjusting a speed of a rotor associated with the wind turbine according to the error signal; and confining a real-time position of the wind wake to the desired location range of the wind wake.

In an embodiment the system is configured to reduce the levelized cost of energy by increasing turbine density at a given site or via the addition of turbines of different types, such as different hub heights because of the ability to stabilize wake trajectory.

It will be appreciated that variations of the above-disclosed and other features and functions, or alternatives thereof, may be desirably combined into many other different systems or applications. Also, it should be appreciated that various presently unforeseen or unanticipated alternatives, modifications, variations, or improvements therein may be subsequently made by those skilled in the art which are also intended to be encompassed by the following claims.

What is claimed is:

1. A system for wind turbine optimization comprising:
a processor; and
a computer-usable medium embodying computer code, said computer-usable medium being coupled to said processor, said computer code comprising non-transitory instruction media executable by said processor configured for:
calibrating a controller wherein calibrating the controller comprises directly measuring wake trajectory deviations by measuring velocity time-series signal spectral energy amplitude changes at periods equivalent to one or more rotations obtained from experiments on models in wind tunnels;
setting a desired location range of a wind wake with the controller;
determining an error signal;
adjusting a speed of a rotor associated with a wind turbine according to the error signal in order to minimize the error signal; and
confining a real-time position of the wind wake to the desired location range of the wind wake by minimizing the error signal.

2. The system of claim 1 further comprising:
generating a look up table of a yaw misalignment angle, a rotor speed, and cross-stream thrust.

3. The system of claim 2 wherein calibrating the controller further comprises:
calibrating the controller with the look up table.

4. The system of claim 3 wherein the look up table is associated with a specific turbine design.

5. The system of claim 4 further comprising prescribing controller variables wherein the controller variables comprise at least one of:
pitch;
yaw; and
speed.

6. The system of claim 1 wherein the error signal comprises:

a difference between a currently measured cross-stream thrust component of wind and an optimal cross-stream thrust component of wind.

7. The system of claim 6 further comprising:

readjusting the rotor speed, to minimize the difference between the currently measured cross-stream thrust component of wind and the optimal cross-stream thrust component of wind.

8. The system of claim 1 wherein setting the desired location range of a wind wake with a controller further comprises:

selecting the desired location range to maximize efficiency of a wind farm comprising a plurality of wind turbines.

9. A wind turbine optimization method comprising:

calibrating a controller wherein calibrating the controller comprises directly measuring wake trajectory deviations by measuring velocity time-series signal spectral energy amplitude changes at periods equivalent to one or more rotations obtained from experiments on models in wind tunnels;

setting a desired location range of a wind wake with a controller;

determining an error signal in order to minimize the error signal;

adjusting a speed of a rotor associated with a wind turbine according to the error signal; and confining a real-time position of the wind wake to the desired location range of the wind wake by minimizing the error signal.

10. The method of claim 9 further comprising:

generating a look up table of a yaw misalignment angle, a rotor speed, and cross-stream thrust.

11. The method of claim 10 wherein calibrating the controller further comprises:

calibrating the controller with the look up table.

12. The method of claim 10 further comprising:

prescribing controller variables in response to changes in cross-stream thrust using unsupervised machine learning, wherein the controller variables comprise at least one of:

pitch;

yaw; and speed.

13. The method of claim 9 wherein the error signal comprises:

a difference between a currently measured cross-stream thrust component of wind and an optimal cross-stream thrust component of wind.

14. The method of claim 13 further comprising:

readjusting rotor speed to minimize the difference between the currently measured cross-stream thrust component of wind and the optimal cross-stream thrust component of wind.

15. The method of claim 14 further comprising:

mitigating wake meander from a set trajectory, the wake meander resulting from instantaneous changes in inflow wind conditions.

16. The method of claim 14 further comprising:

mitigating adverse loads on the wind turbine due to instantaneous yaw misalignments caused by changes in inflow wind conditions, the inflow wind conditions comprising at least one of:

wind direction;

speed; and atmospheric stratification.

17. An apparatus for wind turbine optimization comprising:

a wind turbine;

a processor; and a computer-usable medium embodying computer code, said computer-usable medium being coupled to said processor, said computer code comprising non-transitory instruction media executable by said processor configured for:

calibrating a controller with data obtained from experiments on models in wind tunnels the data comprising directly measured wake trajectory deviations collected by measuring velocity time-series signal spectral energy amplitude changes at periods equivalent to one or more rotations;

setting a desired location range of a wind wake with the controller;

determining an error signal;

adjusting a speed of a rotor associated with the wind turbine according to the error signal in order to minimize the error signal; and confining a real-time position of the wind wake to the desired location range of the wind wake by minimizing the error signal.

\* \* \* \* \*